United States Patent [19]

Brown

[11] Patent Number: 5,900,051
[45] Date of Patent: May 4, 1999

[54] COMPOSITIONS AND METHOD FOR CONDITIONING MINERAL OXIDE PIGMENT

[75] Inventor: Stephen P. Brown, Athens, Ill.

[73] Assignee: Solomon Grind-Chem Service, Inc., Springfield, Ill.

[21] Appl. No.: 08/859,152

[22] Filed: May 20, 1997

[51] Int. Cl.$^6$ ................................. C09C 1/00; C08L 5/00
[52] U.S. Cl. ..................... 106/501.1; 106/425; 106/436; 106/453; 106/456; 106/480; 106/493; 106/499
[58] Field of Search ..................................... 106/425, 436, 106/453, 456, 480, 493, 499, 501.1

[56] References Cited

U.S. PATENT DOCUMENTS

| | | | |
|---|---|---|---|
| 4,946,505 | 8/1990 | Jungk | 106/712 |
| 5,143,671 | 9/1992 | Peters et al. | 106/503 |
| 5,328,506 | 7/1994 | Crumbley et al. | 106/416 |

OTHER PUBLICATIONS

Article "How to dedust your friable material in a continuous blender", Powder and Bulk Engineering, Jan. 1997.

*Primary Examiner*—Anthony Green
*Attorney, Agent, or Firm*—Haverstock, Garrett & Roberts

[57] ABSTRACT

The present invention relates to conditioned pigment particle compositions which are used to color water based materials, such as hydrates, and methods for producing the conditioned pigment particle compositions. The conditioned pigment particles are made by first establishing a pigment color by selecting or combining non-conditioned pigment particles and then mixing the non-conditioned pigment particles having the desired color with an amount of binder to form agglomerated conditioned pigment particles. The conditioned pigment particles produced by the present method have an angle of repose ranging between about 28° and about 34° and a degradation rate of less than 5%.

18 Claims, No Drawings

COMPOSITIONS AND METHOD FOR CONDITIONING MINERAL OXIDE PIGMENT

FIELD OF THE INVENTION

The present invention relates to pigments which can be used to color water based systems and a method for making the pigments. More specifically, the present invention relates to mineral oxide pigments and a method for making the mineral oxide pigments, which are uniquely useful to color hydrate materials, such as concrete.

BACKGROUND OF THE INVENTION

Mineral oxides have been used for centuries as pigments for both surface and integral coloring. Currently synthetic mineral oxides, ferric oxide, ferrous oxide, chromium green, cobalt blue, and titanium oxide, to name a few, are used as pigments for the coloring of hydrates. Mineral oxide pigments of different particle sizes can be used to color various water based materials, such as concrete; however, pigments having smaller particle sizes, less than 75 microns, are generally preferred. The pigment particles are of a variety of shapes and sizes with the smaller sized mineral oxide pigment particles (both natural and synthetic mineral oxides) having a greater total surface area percentage as compared to the total percentage of surface area in the larger sized pigment particles. This means that if two groups of pigment particles having the same mass/weight were compared side by side, with one group of pigment particles having an average particle size diameter that was equal to half the average diameter of the other group of pigment particles, the group with the smaller particle size diameter would have roughly twice the surface area. The greater surface area means that if everything else is equal, the smaller particle size pigments would have a much higher tinting strength than similar pigment particles of a coarser grind and larger size. The higher tinting strength allows for a lesser amount of pigment to be used, which presumably makes the smaller sized pigments more economical to use than coarsely ground pigment particles.

While mineral oxide pigments of a smaller particle size are advantageous because they have a higher tinting strength, they are disadvantageous because the handling characteristics are undesirable. Smaller sized pigment particles tend to build-up on mixing equipment used to produce the pigments, which means that the equipment must be extensively cleaned when the pigment colors are changed. Additionally, the smaller size pigment particles tend to remain on the walls of the packaging containing the pigment particles leading to the loss of some of the pigment product. Thus, the advantages gained by having to use lesser amounts of pigment particles, as a result of having a higher tinting strength, are diminished because some of the product remains in the packaging. Another problem is that as a class the smaller size pigment particles do not flow freely, meaning that even though the particles have a higher tinting strength they do not readily disperse in hydrates or similar materials. The lack of disperseability of the smaller pigment particles is in part attributable to the angle of repose which is equal to about 50°. An increased angle of repose results in decreased flowability and disperseability of the pigments. Because the small pigment particles are not readily dispersible, this results in a longer mixing time when the pigments are added to the hydrates. Consequently, costs are increased because it takes more time and energy to mix the pigments with the hydrates, more time is required to clean the equipment, and not all the pigments are used.

A further problem associated with smaller sized pigment particles is that they tend to cake and form lumps when kept in storage for extended periods of time. This is especially disadvantageous because the lumps of the pigment particles may not completely disperse when mixed with hydrates or similar materials, resulting in a hydrate that is not uniformly colored. The lumped pigments may also cause the finished hydrate or cement product to have lumps of undispersed pigment in the material matrix meaning that the material may less structural strength.

Another problem associated with smaller sized pigment particles is the creation of dust. In a pigment production plant, dust is generated at nearly every step involved in the processing of the pigments, including the drying, grinding, transporting, and packaging steps. As a result, these production plants spend a great deal of time and money on housekeeping to prevent cross contamination of products. Besides increasing the costs of the production of the pigment particles, mineral oxide pigment dust can be a possible source of pollution leading to public relations problems.

Currently, known technologies include two options for making mineral oxide pigment particles which have a high tinting strength and which are dustless. The first option involves producing the mineral oxide pigment particles in an aqueous slurry, which can be advantageous because the pigment slurries are pumpable and are readily measurable by weight or volume. However, slurries suffer from the disadvantage that they are not very cost effective because the slurries weigh more than dry pigments and thus shipping costs increase as a result of including water with the pigments. Also, to achieve a slurry with a high solids content, a chemical additive must be included in the slurry thereby further increasing the cost of the pigments. Another problem associated with slurries is that they tend to settle and dry out if stored for extended periods of time or if not properly stored. One other problem associated with slurried pigments is that the metering equipment must be cleaned regularly to prevent cloggin and the equipment must be thoroughly cleaned when changing colors.

The second option for making pigments having a high tinting strength is for the pigment slurry to be spray dried to remove the water. Spray drying results in free flowing and dustless pigments agglomerated in bead form having an angle of repose of about 34°. The pigment beads will readily redisperse in high slump concrete (ready mix and wet cast concrete); however, in zero or low slump concrete (block, paver and retaining wall stones) the redispersion can be slower than powdered pigments. Slow redispersion of the spray dried mineral oxide pigments is attributable to the lack of porosity of the spray dried pigments. The slow redispersion of the spray dried mineral oxide pigment beads is also a problem because higher production block plants for making blocks generally cannot devote the additional time required to get complete dispersion of the beaded pigments.

It is desirable to have a method for producing pigment particles that have high tinting strength and which are free of the problems mentioned above. Specifically, because of the problems associated with small sized mineral oxide pigment particles, it is desirable to have: a process for forming dry mineral oxide pigment particles that are non-dusting; pigment particles that readily disperse in all types of hydrates in a short amount of time; and, pigment particles that do not clump when stored for long periods of time, nor break down with the passage of time. As will be seen, the present inventive method and compositions eliminate the aforementioned problems.

SUMMARY

The present invention relates to a method for conditioning pigment particles which produces agglomerated pigment particles which have a greater particle size than the pigment particles prior to conditioning and which are porous and have an angle of repose less than 35°. The present invention also relates to the pigment particles produced by the present method. The conditioned pigment particles of the present invention are made by agglomerating non-conditioned pigment particles to form conditioned pigment particles which are agglomerated porous spherical shaped pigment particles that readily disperse in water based systems, such as hydrates.

The method for making the conditioned pigments of the present invention requires agglomerating non-conditioned pigment particles with a binder after the desired color of the conditioned pigment has been selected. In selecting the color of the conditioned pigment, non-conditioned pigment particles having the desired color can be chosen or at least two colors of non-conditioned pigment particles may be blended together to achieve the desired finished color in the conditioned pigment particles. Once the desired color of the conditioned pigment particles has been developed or selected the pigment particles are agglomerated. Regardless of how the color of the conditioned pigment particles is developed, the desired pigment color must be established prior to the agglomeration of the pigment particles. If the pigment particles are agglomerated and then blended to form a desired color, the range of available colors that can be formed is lessened and the rate of disperseability of the pigment particles in water based materials is decreased. Any method of agglomerating the pigment particles can be used so long as the resulting agglomerated pigment particles are porous and have an angle of repose less than 35°.

Once agglomerated, the porous pigment particles can be mixed with the material being colored or can be dried to form the conditioned pigment particles. If the agglomerated pigment particles are dried it is important to the present invention that the porous spherical structure of the agglomerated pigments be maintained, because the porosity and spherical structure impart desirable dispersion characteristics to the conditioned pigment particles. Thus, the desired color of the pigment particles must be achieved prior to agglomeration of the pigment particles and the drying step must maintain the porous structure of the pigment particle agglomerates. The conditioned pigment particles formed by the present method preferably have a particle size ranging between about 150 microns and about 850 microns, an angle of repose ranging between about 28° and about 34°, and a degradation rate of less then 5% of the total conditioned pigment particles; however, other characteristics can be developed dependent on the end use of the pigment particles.

A variety of inorganic and organic pigment particles can be used in the present process; however, the preferred pigment particles are inorganic pigment particles and more preferably mineral oxide pigment particles. Also, a binder is necessary to allow the pigment particles to agglomerate with one another. Any binder is acceptable that allows for the pigment particles to bind to one another to form conditioned pigment particles having a porous spherical structure.

DETAILED DESCRIPTION OF THE PREFERRED EMBODIMENTS

The present invention relates to pigment particles, preferably mineral oxide pigment particles, which have been conditioned to have improved processing and handling characteristics and a method for producing such conditioned pigment particles. The conditioned pigment particles formed by the present process are used to color water based materials such as hydrates, including concrete and cement. Further, the pigment particles resulting from the present process are especially desirable because they readily disperse in concrete, including low slump concrete, and they have a high tinting strength. In order to form the pigment particles having the improved processing and handling characteristics certain steps of the present method must be followed. The necessary steps include selecting the desired color of the conditioned pigment and then mixing the pigment particles with a binder so as to cause the pigment particles to agglomerate.

The present process is initiated by determining what color of pigment particles will be used to color the hydrates or similar water based materials, with the pigment particles used to color the water based materials known as conditioned pigment particles. However, the color of the conditioned pigment particles is developed with non-conditioned pigment particles prior to the agglomerating and conditioning of the pigment particles. The non-conditioned pigment particles, including mineral oxide pigment particles, are found in a variety of colors, which can be used alone or in combination. The color is established by placing a single color of non-conditioned pigment particles in a device used to agglomerate the pigment particles or by blending two or more colors of non-conditioned pigment particles to form the desired color. Thus, the color of the pigment particles to be used in coloring concrete, for example, is achieved by either selecting non-conditioned pigment particles of the desired color or by blending more than one color of non-conditioned pigment particles together to form the desired color.

The amount of non-conditioned pigment particles used to establish a color is determined by the desired amount of conditioned pigment particles. Any amount of conditioned pigment particles can be made with the only limitations being the size of the equipment and the amount of non-conditioned pigment particles and binder available. Generally, the amount of non-conditioned pigment particles used in a batch process will range between about 20 pounds and about 150 pounds per batch. If a continuous system is used enough non-conditioned pigment particles must be selected to produce between about 100 pounds of conditioned pigment particles per hour and about 2000 pounds of conditioned pigment particles per hour. Again, these amounts can vary, dependent upon the type of machinery used.

The non-conditioned pigment particles that can be used either alone or blended together are typically mineral oxide pigments and are selected from the group of inorganic pigments consisting of regenerated pigments, natural pigments, synthetic pigments, or a combination thereof; however, the mineral oxide pigments are more preferably selected from the group consisting of iron oxides, zinc oxides, titanium oxides, cobalt oxides, and chromium oxides. The most preferred mineral oxide pigment is an iron oxide pigment selected from the group consisting of yellow iron oxide, black iron oxide, red iron oxide, and combinations thereof. While inorganic pigment particles are preferred, organic pigment particles can also be used. The particle size of the non-conditioned pigment particles will typically range between about 5 microns and about 75 microns, but other micron sizes can be used depending on the tinting strength of the pigments. The angle of repose of the non-conditioned pigment particles will be equal to about 50.

The time period for forming a color made by blending more than one color of non-conditioned pigment particles together varies dependent upon the color of the non-conditioned pigment particles, the number of different colors of pigment particles required to form the finished color of conditioned pigment particles, and the machinery used to blend the pigment particles. Any amount of time for blending the pigment particles is acceptable as long as the desired end color is achieved; however, typically the time for blending ranges between about 10 minutes and about 30 minutes. The colors of the unblended non-conditioned pigment particles are shades of red, yellow, and black. When the colors are blended a wide variety of colors can be achieved including, but not limited to, buffs, oranges, tans, browns, and maroons.

If the non-conditioned pigment particles need to be blended to form a desired color, the pigment particles are blended, before agglomeration, in any device capable of adequately mixing and blending the pigment particles to form the desired color. A variety of blenders can be used to mix the non-conditioned pigment particles, including ribbon and paddle blenders, turbulent blenders, drum blenders, and double cone blenders. The preferred device for blending the non-conditioned pigment particles is a ribbon and paddle blender. A more preferred ribbon and paddle blender is a Littleford Plowshare Mixer which is configured with two (2) plows and one (1) 4-bar "Christmas Tree Chopper" with the plows blending the pigment particles at a speed of about 155 revolutions per minute and the chopper rotating at about 3,600 revolutions per minute. Typically, the Littleford Plowshare Mixer can blend two colors of pigment particles together to form a desired color in 10 minutes or less. Also, the Littleford Plowshare Mixer plows can be turned at a variety of speeds. But, it is preferred to have the plows turn at the maximum possible speed because the faster the speed the faster the blending of the pigment colors and, as will be discussed, the faster the agglomeration.

As mentioned, the desired color of the pigment particles must be established prior to agglomerating the pigment particles. Establishing the color of the pigment particles prior to agglomeration allows the conditioned pigment particles to have the characteristics of non-dusting, low degradation rates, high flowability or disperseability, and the non-formation of clumps or caking when stored for long periods of time. These characteristics will not be achieved if the pigment particles are agglomerated and then the color of the conditioned pigment is formed by blending two colors of agglomerated pigment particles together. Also, a wider range of colors can be achieved by establishing the color prior to agglomeration.

Once the color of the pigment particles is developed, the pigment particles are agglomerated in a device known as an agglomeration chamber, wherein the pigment particles are mixed with a binder. The agglomeration chamber device can be either a mechanical mixing means device or a pneumatic mixing means device. Also, a compaction process and an extrusion process can be used to agglomerate the pigments. Generally, the compaction and extrusion processes are not used because the resulting agglomerated pigment particles typically do not have a porous structure. Regardless of the means used to form the agglomerated pigment particles, means must be chosen which allows for the formation of agglomerated pigment particles that are porous.

The mechanical mixing means used to agglomerate the pigment particles can be selected from a variety of mixers and similar devices. Among the mechanical means available for agglomerating the pigment particles is a blender, with the blender being potentially the same device previously used to blend the multiple colors of non-conditioned pigment particles together. Use of the blender to agglomerate the pigment particles is preferred because the non-conditioned pigment particles do not have to be transferred from one device to another, instead the pigment particles can remain in the same device used to form the finished color of the pigment particles. Thus, the most preferred device for agglomerating the pigments is the Littleford Plowshare Mixer, generally an FKM model 8000, configured with two (2) plows and one (1) 4-bar "Christmas Tree Chopper" with the plows blending the pigment and binder at a speed of about 155 revolutions per minute and the chopper rotating at about 3,600 revolutions per minute. The speed of the plows will effect the time required to agglomerate the pigment particles.

The agglomeration step is initiated by adding the pigment particles of a desired color to the agglomeration chamber and then spraying a liquid binder directly into the agglomeration chamber or blender to mix with the pigment particles. The pigment particles and binder are mixed together to form agglomerated pigment particles having a porous structure. The total time for mixing the pigment particles and binder will be equal to between about 30 seconds and about 30 minutes, with the preferred time being about 15 minutes. The longer the pigment particles are mixed with the binder, the larger the agglomerated pigment particles, meaning that the desired size of the agglomerated pigment particles dictates the time for agglomeration.

The amount of pigment particles in the agglomeration chamber, if a batch process is used, will range between about 20 pounds and about 150 pounds, with the pigment particles having an amount of binder added thereto equal to from about 10 pounds to about 40 pounds. While these are the preferred amounts, other amounts of pigment particles and binder can be used dependent upon the water absorption qualities of the pigment particles and the size of the unit used to agglomerate the pigment particles. If a continuous process is used, the amount of pigment particles being agglomerated can vary, with the preferred amount being enough to produce between about 100 pounds of conditioned pigment particles per hour and about 2000 pounds of conditioned pigment particles per hour.

The binder can be any aqueous substance that binds the pigment particles together to form agglomerated porous pigment particles, with the binder preferably selected from the group consisting of water and chitosan solutions, as well as other binders that cause the pigments to agglomerate. It is most preferred, however, for the binder to be an aqueous solution containing chitosan. The aqueous chitosan solution will contain an amount of water and an amount of chitosan biopolymer, with the chitosan biopolymer added to the water in an amount equal to from about 0.5% by weight of the total solution to about 15% by weight of the total solution. The preferred amount of chitosan biopolymer being added to the water to form the chitosan solution is equal to about 7.5% by weight of the total solution. The chitosan and water are mixed together for approximately 30 minutes to form the chitosan binder solution. The binder solution is added to the pigment particles in an amount equal to from about 0.05% to about 35% by weight of the pigment particles prior to agglomeration. The more preferred amount of binder solution added to the pigment particles is between about 0.5% by weight of the pigment particles prior to agglomeration and about 2.5% by weight of the pigment particles prior to agglomeration.

The agglomeration process mixes the binder and pigment particles together so that the binder makes the pigment particles sticky which causes the pigment particles to stick together and form agglomerated porous pigment particles. As the binder and pigment particles are mixed the pigment particles that are stuck together are aerated thereby exposing more of the surface area of the pigment particles to the binder, with the agglomeration of the pigment particles occurring when the dry pigment particles contact the pigment particles which have been moistened by the binder. Aerating the pigment particles is important because this will result in the agglomerated pigment particles being porous and substantially spherical. Thus, when the pigment particles and binder are mixed, the pigment particles will stick to each other and build up porous agglomerates which form the agglomerated porous pigment particles. Also, the addition of the binder is desirable because this prevents the conditioned pigment particles from dusting.

The porosity of the agglomerated pigment particles is important because as the porosity of the pigment particles is increased this results in the pigment particles becoming more flowable in water based materials, such as hydrates. Increased flowability means that the pigment particles will more thoroughly disperse in a shorter amount of time in the water based materials, including the hydrates. Thus, agglomeration is a process whereby the pigment particles are attached to one another through use of a binder to form substantially spherical shaped porous pigment particles, with the preferred method of agglomeration resulting in substantially spherical shaped agglomerated pigment particles having varying degrees of voids.

In pneumatic mixing, the liquid or binder is sprayed into the pigment particles as the particles travel over a fluidized bed. The pigment particles are aerated as they pass through the fluidized bed so as to expose the surface of the pigment particles to the binder. The amount of binder, the retention time in the fluid bed, and the fluidizing air flow will determine the size of the agglomerated pigment particles.

Once the agglomeration step is completed, the agglomerated pigments can be dried in a unit that will maintain the porosity and the spherical shape of the agglomerated pigment particles or the agglomerated pigments can be passed directly into the material to be colored. Generally, the drying of the agglomerated pigment particles can be achieved by either using a fluid bed dryer or a forced air dryer. Preferably a fluid bed dryer is used that has an inlet temperature of about 170° F. and an outlet temperature of about 130° F. The temperature of the fluid bed dryer can vary, with any temperature being acceptable so long as the agglomerated pigment particles are adequately dried without destroying the porous structure of the agglomerated pigment particles. The amount of time it takes to dry the agglomerated pigment particles varies dependent upon the water absorption qualities of the pigments; but, the preferred drying time ranges between about 10 minutes and about 30 minutes.

After the drying step, the dried agglomerated pigment particles, known as conditioned pigment particles, can be separated according to size by a sizer device. The sizer device allows for the passage of the conditioned pigment particles typically ranging in size from about 150 to about 850 microns and separates pigment particles not falling within the preferred size range. An eight (8) inch sieve can be used having mesh sizes of 20 and 100. If the conditioned pigment particles are less than 150 microns when they pass through the sizer then they are returned to the agglomeration step to be re-agglomerated. If the conditioned pigment particles are of a size greater than 850 microns, then the conditioned pigment particles are gently crushed to the proper size and the fines are returned to be re-agglomerated.

After completion of the above listed inventive process the conditioned pigment particles are substantially spherical shaped and porous while having an angle of repose ranging between about 28° and about 34°, more preferably the angle of repose is equal to or less than 32°, and a degradation rate of less then 5% of the total conditioned pigment particles, while maintaining high disperseability in water based materials. The angle of repose is important because the lesser the angle the better the characteristics of the conditioned pigment particles in that the conditioned particles will more easily flow into the water based materials when mixed therein. Also, it is preferred to have a low degradation rate as it is undesirable to have the pigment particles degrade at a high level.

The conditioned pigment particles are typically added to water based materials, preferably hydrates, including, concrete, portland cement, other types of cement, and mixtures of cement and hydrates.

EXAMPLE 1

Conditioned pigment particles were formed as follows. Approximately, 125 pounds of synthetic red iron oxide pigment particles having a particle size equal to between about 5 microns and about 75 microns and an angle of repose equal to approximately 50° were placed in a Littleford FKM Series Ploughshare Mixer, model FKM 130, manufactured by Littleford Inc., Florence, Ky., which was configured with two (2) plows and one (1) 4-bar "Christmas Tree Chopper." The iron oxide pigment particles were manufactured by Brotec in Germany. The iron oxide pigment particles were added while the plows of the blender were rotating at a speed of 155 revolutions per minute and the chopper was rotating at 3,600 revolutions per minute.

After all of iron oxide pigment particles were added to the blender, 20 pounds of water was injected into the blender through a spray nozzle while the blender continued to run. The water and synthetic red oxide pigment particles were mixed together for a total of 15 minutes, with the pigment particles and the water forming agglomerated pigment particles at the end of the 15 minutes. The agglomerated pigment particles were then transferred from the blender to a fluid bed dryer, which was a Barr and Murphy fluid bed dryer lab unit manufactured by Barr and Murphy, Oakbrook, Ill., having an inlet temperature of 170° F. and an outlet temperature of 130° F. By passing the agglomerated pigment particles through the fluid bed dryer, conditioned pigment particles were formed and which had the same porous structure as the agglomerated pigment particles. The agglomerated pigment particles were in the dryer for approximately 10 minutes.

After drying, the conditioned pigment particles were then passed through a sizer manufactured by W. S. Tyler of Mentor, Ohio, which was an eight inch hand sieve and had mesh sizes of 20 and 100 so that the conditioned pigment particles that passed through the sizer had a particle size ranging between about 150 and about 850 microns. The conditioned pigment particles that were oversized, or greater than 850 microns, were passed into a device to be crushed, the device was a Quadra Comil model 196 manufactured Quadra Inc., Clifton, N.J., where the particles were broken apart so that the pigment particles had a size ranging between about 150 and about 850 microns. The conditioned pigment particles that were undersized, under 150 microns, were passed back through the process to be re-agglomerated with the binder.

The degree of degradation of the dried agglomerated pigments was determined by placing 200 grams of the conditioned pigment particles in a one (1) pint jar. The pint jar was then placed on a rotary tumbler for 1 hour. After the passage of 1 hour the amount of pigment fines that passed through a 100 mesh screen were measured. The percentage of fines determined the degree of degradation.

Upon passing through the sizer, the conditioned pigment particles had an angle of repose of about 34° and a degradation rate of approximately 5.4%. The conditioned pigment particles proved to be free flowing, non-caking and only slightly dusting. The degradation rate was too high, however.

EXAMPLE 2

Conditioned pigment particles were formed as follows. Approximately, 125 pounds of synthetic red iron oxide pigment particles having a particle size equal to between about 5 microns and about 75 microns and an angle of repose equal to approximately 50° were placed in a Littleford FKM Series Ploughshare Mixer, model FKM 130, manufactured by Littleford Inc., Florence, Ky., which was configured with two (2) plows and one (1) 4-bar "Christmas Tree Chopper." The iron oxide pigment particles were manufactured by Brotec in Germany. The iron oxide pigment particles were added while the plows of the blender were rotating at a speed of 155 revolutions per minute and the chopper was rotating at 3,600 revolutions per minute.

A binder solution was prepared by dissolving 3.0 pounds of a chitosan based biopolymer, known as WOT Poly 325 manufactured by Water and Oil Technologies, Montgomery, Ill., in 4.4 gallons of water. The water and chitosan biopolymer were then mixed in a high speed dispenser, manufactured by Inco, Inc. located in New Albany, Ind., which had an F-type sawtooth blade and which turned at 500 revolutions per minute. The water and chitosan based biopolymer were mixed together for 30 minutes. Upon completion of the mixing step a binder solution was formed having an amount of binder equal to 7.5% by weight of the total binder solution.

After all of iron oxide pigment particles were added to the blender, 25.6 pounds of the binder solution made from the chitosan biopolymer was injected into the blender through a spray nozzle while the blender continued to run. The binder solution and synthetic red oxide pigment particles were mixed together for a total of 15.5 minutes, with the pigment particles and the binder solution forming porous agglomerated pigment particles at the end of the 15.5 minutes.

The agglomerated pigment particles were then transferred from the blender to a fluid bed dryer, which was a Barr and Murphy fluid bed dryer lab unit manufactured by Barr and Murphy, Oakbrook, Ill., having an inlet temperature of 170° F. and an outlet temperature of 130° F. By passing the agglomerated pigment particles through the fluid bed dryer, conditioned pigment particles were formed which had the same porous structure as the agglomerated pigment particles. The agglomerated pigment particles were in the dryer for approximately 10 minutes.

After drying, the conditioned pigment particles were then passed through a sizer manufactured by W. S. Tyler of Mentor, Ohio, which was an eight inch hand sieve and had mesh sizes of 20 and 100 so that the conditioned pigment particles that passed through the sizer had a particle size ranging between about 150 and about 850 microns. The conditioned pigment particles that were oversized, or greater than 850 microns, were passed into a device to be crushed, the device was a Quadra Comil model 196 manufactured Quadra Inc., Clifton, N.J., where the particles were broken apart so that the pigment particles had a size ranging between about 150 and about 850 microns. The conditioned pigment particles that were undersized, under 150 microns, were passed back through the process to be re-agglomerated with the binder.

Upon passing through the sizer, the conditioned pigment particles had an angle of repose of about 30° and a degradation rate of approximately 3.0%. Like Example 1 the pigment particles of the present example proved to be free flowing, non-caking, and dust free. But, as can be seen the degradation rate of the pigment particles of the present example is lower than the degradation rate of the pigment particles of Example 1. In fact there is 3.0% difference between the degradation rate of the pigment particles in Example 1 versus the present example. This demonstrates that use of the binder is preferred because the binder allows for the formation of pigment particles which are less likely to degrade than pigment particles formed with water. Also, it was observed that the particles were more free flowing than the particles of Example 1, because the angle of repose was smaller. The degradation rate was determined by using the same procedure discussed in Example 1.

EXAMPLE 3

Conditioned pigment particles were formed as follows. Approximately, 75 pounds of synthetic red iron oxide pigment particles having a particle size equal to between about 5 microns and about 75 microns and an angle of repose equal to approximately 50° were placed in a Littleford FKM Series Ploughshare Mixer, model FKM 130, manufactured by Littleford Inc., Florence, Ky., which was configured with two (2) plows and one (1) 4-bar "Christmas Tree Chopper." The iron oxide pigment particles were manufactured by Brotec in Germany. The iron oxide pigment particles were added while the plows of the blender were rotating at a speed of 75 revolutions per minute and the chopper was rotating at 3,600 revolutions per minute.

A binder solution was prepared the same as disclosed in Example 2.

After all of iron oxide pigment particles were added to the blender, 13.2 pounds of the binder solution made from the chitosan biopolymer was injected into the blender through a spray nozzle while the blender continued to run. The binder solution and synthetic red oxide pigment particles were mixed together for a total of 15 minutes, with the pigment particles and the binder solution forming porous agglomerated pigment particles at the end of the 15 minutes. The agglomerated pigment particles were then transferred from the blender to a dryer, which was a fluid bed dryer with the drying procedure being the same as disclosed in Example 2.

The particles were then sized according to the same procedure disclosed in Example 2.

Upon passing through the sizer, the conditioned pigment particles had an angle of repose of about 30° and a degradation rate of approximately 2.5%. Like Example 1 the pigment particles of the present example proved to be free flowing, non-caking, and dust free. But, as can be seen the degradation rate of the pigment particles of the present example is lower than the degradation rate of the pigment particles of Example 1. In fact there is essentially a 3.0% difference between the degradation rate of the pigment particles in Example 1 versus the present example. This demonstrates that use of the binder is preferred because the binder allows for the formation of pigment particles which are less likely to degrade than pigment particles formed with water. Thus, the results in the present example are similar to the results in Example 2, except the batch size of the present example was smaller.

EXAMPLE 4

Conditioned pigment particles were formed as follows. Approximately, 75 pounds of synthetic red iron oxide pigment particles and 75 pounds of synthetic yellow oxide pigment particles, each having a particle size equal to between about 5 microns and about 75 microns and an angle of repose equal to approximately 50° were placed in a Littleford FKM Series Ploughshare Mixer, model FKM 130, manufactured by Littleford Inc., Florence, Ky., which was configured with two (2) plows and one (1) 4-bar "Christmas Tree Chopper." The iron oxide pigment particles were manufactured by Brotec in Germany. The iron oxide pigment particles were added while the plows of the blender were rotating at a speed of 75 revolutions per minute and the chopper was rotating at 3,600 revolutions per minute.

A binder solution was prepared the same as disclosed in Example 2.

After the pigment particles were sufficiently blended, approximately 10 minutes, to form the desired orange color, 25.0 pounds of the binder solution made from the chitosan biopolymer was injected into the blender through a spray nozzle while the blender continued to run. The binder solution and pigment particles were mixed together for a total of 15.0 minutes, with the pigment particles and the binder solution forming porous agglomerated pigment particles at the end of the 15.0 minutes. The agglomerated pigment particles were then transferred from the blender to a dryer, with the drying, procedure being the same as disclosed in Example 2.

The particles were then sized according to the same procedure disclosed in Example 2.

Upon passing through the sizer, the conditioned pigment particles had an angle of repose of about 32° and a degradation rate of approximately 2.9%. The pigment particles of the present example proved to be free flowing, non-caking, and dustless. As can be seen, however, the present composition required that a greater percentage of binder solution be used as compared to the compositions disclosed in the other examples. This is because the yellow iron oxide pigment has a higher water absorption rate. Thus, this example shows that pigments can be blended and that the amount of binder solution required may vary dependent upon the type of pigment used.

EXAMPLE 5

Conditioned pigment particles were formed as follows. Approximately, 75 pounds of synthetic black iron oxide pigment particles having a particle size equal to between about 5 microns and about 75 microns and an angle of repose equal to approximately 50° were placed in a Littleford FKM Series Ploughshare Mixer, model FKM 130, manufactured by Littleford Inc., Florence, Ky., which was configured with two (2) plows and one (1) 4-bar "Christmas Tree Chopper." The iron oxide pigment particles were manufactured by Brotec in Germany. The iron oxide pigment particles were added while the plows of the blender were rotating at a speed of 75 revolutions per minute and the chopper was rotating at 3,600 revolutions per minute.

A binder solution was prepared the same as disclosed in Example 2.

After all of black iron oxide pigment particles were added to the blender, 15.2 pounds of the binder solution made from the chitosan biopolymer was injected into the blender through a spray nozzle while the blender continued to run. The binder solution and synthetic black oxide pigment particles were mixed together for a total of 15.0 minutes, with the pigment particles and the binder solution forming porous agglomerated pigment particles at the end of the 15.0 minutes. The agglomerated pigment particles were then transferred from the blender to a dryer, with the drying procedure being the same as disclosed in Example 2.

The particles were then sized according to the same procedure disclosed in Example 2.

Upon passing through the sizer, the conditioned pigment particles had an angle of repose of about 40° and a degradation rate of approximately 2.2%. The pigment particles of the present example proved to be free flowing, non-caking, and dustless. The present example also showed that black iron oxide pigments can be agglomerated under the present process.

EXAMPLE 6

To test the characteristics of conditioned mineral oxide pigment the following test was conducted. Approximately, 20 pounds of synthetic yellow iron oxide pigment, 20 pounds of synthetic black iron oxide pigment, and 20 pounds of synthetic red iron oxide pigment each having a particle size equal to between about 5 microns and about 75 microns and an angle of repose equal to approximately 50°, were placed in a Littleford FKM Series Ploughshare Mixer, model FKM 130, manufactured by Littleford Inc., Florence, Ky., which was configured with two (2) plows and one (1) 4-bar "Christmas Tree Chopper." The iron oxide pigment particles were manufactured by Brotec in Germany. The iron oxide pigment particles were added while the plows of the blender were rotating at a speed of 155 revolutions per minute and the chopper was rotating at 3,600 revolutions per minute.

A binder solution was prepared the same as disclosed in Example 2.

The blended synthetic pigment particles were then passed through an auger feeder into an agglomeration chamber, which was a Shugi Flex-o-Mix, model FX-100. Added to the 60 pounds of blended pigment particles in the agglomeration chamber was 18 pounds of the binder solution made from the chitosan biopolymer which was injected into the agglomeration chamber through a spray nozzle. The binder solution was added to the blended pigments in an amount equal to 15% by weight of the pigment particles. The binder and blended synthetic pigment particles were mixed together in a continues process so that the agglomerated pigment particles passed through the agglomeration chamber into a dryer.

Upon completion of the 15 minute time period in the agglomeration chamber, the agglomerated pigment was discharged into a drum prior to drying. The agglomerated pigment particles were then passed into a dryer to be dried according to the procedures disclosed in Example 2.

The particles were then sized according to the same procedure disclosed in Example 2.

Upon passing through the sizer the agglomerated pigments had an angle of repose of about 32° and a degradation rate of approximately 2.2%. The agglomerated pigments were then ready for use. This example importantly shows that colors can be combined and that other devices can be used to agglomerate the pigments. Most importantly, the low degradation rate and desirable angle of repose were maintained.

EXAMPLE 7

The dispersion rate of SGS Free Flowing Pigment 415 Red pigment particles having an angle of repose ranging between about 28° and about 34°, was compared to Harcros Red pigment particles and Brokhues Red pigment particles each having an angle of repose ranging between about 45° and about 50°. Each of the pigments were used at a rate of 4 grams of pigment to 188° grams of Lonestar type I gray portland cement, 300 grams white silica sand, and 63 ml. water. The ingredients were placed into a pan and mixed with a Krupps Powermix electric mixer. Each of the three types of pigments were mixed for 15, 30, 60, and 90 seconds, with concrete patties being formed which correspond to each time. The mixed plastic concrete was formed into 4 by 4 by 1 inch patties. A smear was made of each patty by sliding a piece of plate glass over the top surface. When dry, the color intensity was read using a Data Color CS-3 spectrophotometer and "Chroma QC" software.

The blocks mixed for 90 seconds were considered to be 100% dispersed. The smears for each of the trials were compared only to the 90 second trial made with the same pigments. DC relates to how quickly each pigment achieved maximum dispersion, with 0 being maximum dispersion.

| Color, Time | SGS FFP 415 DC | Brokhues Red DC | Hareros Red DC |
|---|---|---|---|
| 15 | −1.92 | −5.77 | −1.16 |
| 30 | −0.37 | −4.18 | −0.69 |
| 45 | | | |
| 60 | −0.11 | −2.5 | −0.74 |
| 75 | | | |
| 90 | 0 | −2.08 | −0.55 |

As can be seen in the table the DC (difference in Chromaticity or color strength) values were lowest for the Brokhues Red pigment. SGS Free Flowing Pigment 415 Red dispersed faster than the Harcros Red pigment and the Brokhues Red pigments. As can be seen the SGS FFP 415 dispersed much faster than the other pigments.

Thus, there as been shown and described novel methods and compositions for conditioning pigment particles which fulfill all the objects and advantages sought therefore. It is be apparent to those skilled in the art, however, that many changes, variation, modification, and other uses and applications for the subject method and composition are possible, and also such changes, variations, modifications, and other uses and applications which do not depart from the spirit and scope of the invention are deemed to be covered by the invention which is limited only by the claims which follow.

What is claimed is:

1. A process for making conditioned pigment particles selected from the group consisting of inorganic and organic pigment particles for use in water based materials wherein said pigment particles produced by said process are agglomerated porous particles which readily disperse in the water based materials, wherein said process includes the steps of:

a) establishing a color of said pigments by selecting pigment particles of at least one color which have not been conditioned by said process;

b) placing an amount of said pigment particles in means designed to mix said pigment particles;

c) adding to said pigment particles in said means designed to mix an amount of binder selected from the group consisting of chitosan solutions equal to between about 0.05% by weight of said pigment particles and about 35% by weight of said pigment particles; and d) mixing said pigment particles with said binder for an amount of time equal to between about 30 seconds and about 30 minutes in said means designed to mix to form conditioned porous agglomerated pigment particles of a selected color having an angle of repose ranging between about 28° and about 34°, a degradation rate of less than 5% of said conditioned porous agglomerated pigment particles, and which are readily dispersible in the water based materials.

2. The process of claim 1 wherein said inorganic pigment particles are selected from the group consisting of mineral oxide pigments.

3. The process of claim 2 wherein said mineral oxide pigment particles are selected from the group consisting of regenerated pigments, natural pigments, synthetic pigments, and combinations thereof.

4. The process of claim 2 wherein said mineral oxide pigment particles are selected from the group consisting of iron oxides, zinc oxides, chromium green, cobalt blue, and titanium oxide.

5. The process of claim 1 wherein said means designed to mix is selected from the group consisting of mechanical mixers and pneumatic mixers.

6. The process of claim 1 wherein said process includes the additional step of drying said porous agglomerated pigment particles in means for drying thereby forming dried porous agglomerated pigment particles.

7. The process of claim 6 wherein said means for drying is selected from the group consisting of fluid bed dryers and forced air dryers.

8. The process of claim 6 wherein said conditioned pigment particles are dried for a time period ranging between about 10 minutes and about 30 minutes.

9. The process of claim 1 wherein the amount of said binder added to said pigment particles is equal to between about 0.5% by weight of said pigment particles and about 2.5% by weight of said pigment particles.

10. The process of claim 1 wherein said chitosan solutions are comprised of an amount of water and an amount of chitosan biopolymer equal to from about 0.5% by weight of said chitosan solution to about 15% by weight of said chitosan solution.

11. The process of claim 1 wherein said conditioned pigment particles range in size between about 150 microns and about 850 microns.

12. The conditioned pigment particles produced by said process of claim 1.

13. A pigment particle composition wherein said composition is made by establishing a color of pigment particles selected from the group consisting of inorganic and organic pigment particles, placing said pigment particles in a blender, and mixing said pigment particles with a binder said binder is selected from the group consisting of chitosan solutions to form agglomerated pigment particles, wherein said pigment particle composition is porous and has a particle size of at least 150 microns, an angle of repose ranging between about 28° and about 34°, and a degradation rate of less than 5% of said agglomerated pigment particles.

14. The composition of claim 13 wherein said inorganic pigment particles are selected from the group consisting of mineral oxide pigments.

15. The composition of claim 14 wherein said mineral oxide pigment particles are selected from the group consisting of regenerated pigments, natural pigments, synthetic pigments, and combinations thereof.

16. The composition of claim 14 wherein said mineral oxide pigment particles are selected from the group consisting of iron oxides, zinc oxides, chromium green, cobalt blue, and titanium oxide.

17. The composition of claim 13 wherein said binder is added to said pigment particles in an amount equal to between about 0.5% by weight of said pigment particles and about 2.5% by weight of said pigment particles.

18. The composition of claim 13 wherein said chitosan solutions are comprised of an amount of water and an amount of chitosan biopolymer equal to from about 0.5% by weight of said chitosan solution to about 15% by weight of said chitosan solution.

* * * * *

UNITED STATES PATENT AND TRADEMARK OFFICE
CERTIFICATE OF CORRECTION

PATENT NO. : 5,900,051
DATED : May 4, 1999
INVENTOR(S) : Stephen P. Brown

It is certified that error appears in the above-indentified patent and that said Letters Patent is hereby corrected as shown below:

Column 4, line 65, "50." should be -- 50°. --.

Column 13, line 10, "188°" should be -- 188 --.

Signed and Sealed this

Fifth Day of October, 1999

Attest:

Q. TODD DICKINSON

*Attesting Officer*

*Acting Commissioner of Patents and Trademarks*